United States Patent [19]

Murata

[11] 4,383,440
[45] May 17, 1983

[54] METHOD AND APPARATUS FOR INSPECTING ROUGH IDLING OF A MULTIPLE-CYLINDER ENGINE

[75] Inventor: Yoichi Murata, Nagoya, Japan

[73] Assignee: Toyota Jidosha Kogyo Kabushiki Kaisha, Toyota, Japan

[21] Appl. No.: 231,024

[22] Filed: Feb. 3, 1981

[30] Foreign Application Priority Data

Sep. 27, 1980 [JP] Japan .............................. 55-134712

[51] Int. Cl.³ ........................................... G01M 15/00
[52] U.S. Cl. ................................................. 73/117.3
[58] Field of Search .............................. 73/117.3, 116

[56] References Cited

U.S. PATENT DOCUMENTS 3,677,075  7/1972  Scott .................................. 73/117.3
4,064,747 12/1977  Rackliffe et al. ...................... 73/116
4,104,990  8/1978  Frobenius ......................... 73/116 X
4,179,922 12/1979  Bouverie et al. ..................... 73/116

Primary Examiner—Jerry W. Myracle
Attorney, Agent, or Firm—Oblon, Fisher, Spivak, McClelland & Maier

[57] ABSTRACT

A method and an apparatus for inspecting rough idling of a multiple-cylinder engine. The method comprises the steps of obtaining the engine speed, obtaining from the data of the engine speed the minimum value of engine speed in the vicinity of the time of starting of explosion in each cylinder, finding differences between the minimum values of the cylinders and inspecting the condition of revolution of the engine by the differences. The apparatus for carrying the method comprises a rotation change detecting sensor, a cylinder sorting sensor mounted to a specific cylinder, a rotation change signal generator and an output difference operation circuit.

4 Claims, 9 Drawing Figures

METHOD AND APPARATUS FOR INSPECTING ROUGH IDLING OF A MULTIPLE-CYLINDER ENGINE

BACKGROUND OF THE INVENTION

1. Field of the Invention

The present invention relates to a method and an apparatus for inspecting rough idling of a multiple-cylinder engine in a bench test after assembling of the engine.

2. Description of the Prior Art

In a general bench test, an assembled multiple-cylinder engine is driven under load at a certain period of time and subjected to an exhaust gas test on a test bench. However, since there has been no apparatus for inspecting the condition of engine revolution, the condition has been inspected only by human sense. Consequently, it has been impossible to correctly find in a short inspection time uneveness of revolution which is remarkably shown at a low speed, leading to problems after appliance of the engine to a vehicle such as abnormal vibration of the vehicle body during idling.

Further, it is difficult to find a cylinder getting out of order because of slightly bad conditions of some parts of the engine, and even in case the bad-conditioned parts can be easily repaired, it takes time to locate the positions thereof.

Still further, even when the engine is found to be in a bad condition, it is difficult to find the cause therefor. In this case, though in fact the engine can pass the bench test by replacement of a part of the cylinders such as an ignition plug or repair of an uncomplicated defective portion, the engine is returned to the factory as a failed one, leading to lowering of productivity and uneveness of engine performance.

SUMMARY OF THE INVENTION

It is an object of the present invention to overcome the aforementioned disadvantages of the prior art by providing a method and an apparatus for inspecting rough idling of a multiple-cylinder engine which can inspect operation efficiency of the engine per each cylinder without utilizing human sense.

It is another object of the present invention to provide a method and an apparatus for inspecting rough idling of a multiple-cylinder engine in which relative speed difference between cylinders is obtained to learn the effect of the engine on the torque of the cylinders and the dynamic efficiency of the engine.

It is still another object of the present invention to provide a method and an apparatus for inspecting rough idling of a multiple-cylinder engine which can quickly detect unbalanced portions of the engine and locate the cylinder out of order for easy reparing of the same.

DESCRIPTION OF THE PREFERRED EMBODIMENTS

Figure 1:
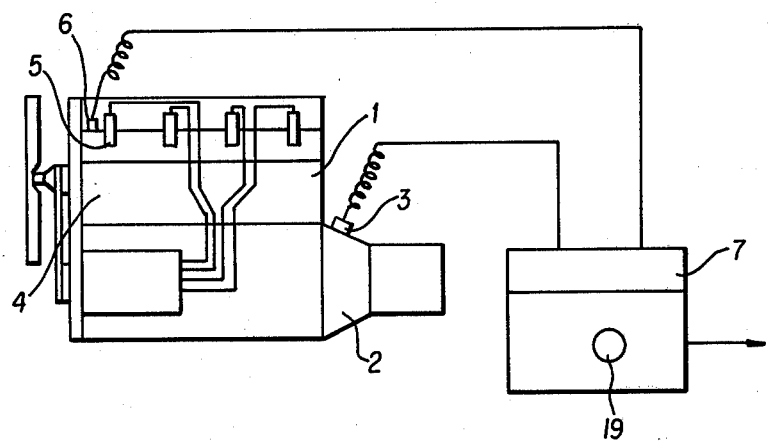
FIG. 1 is an illustrative view showing a first embodiment of the present invention applied to a multiple-cylinder engine.
Figure 2:
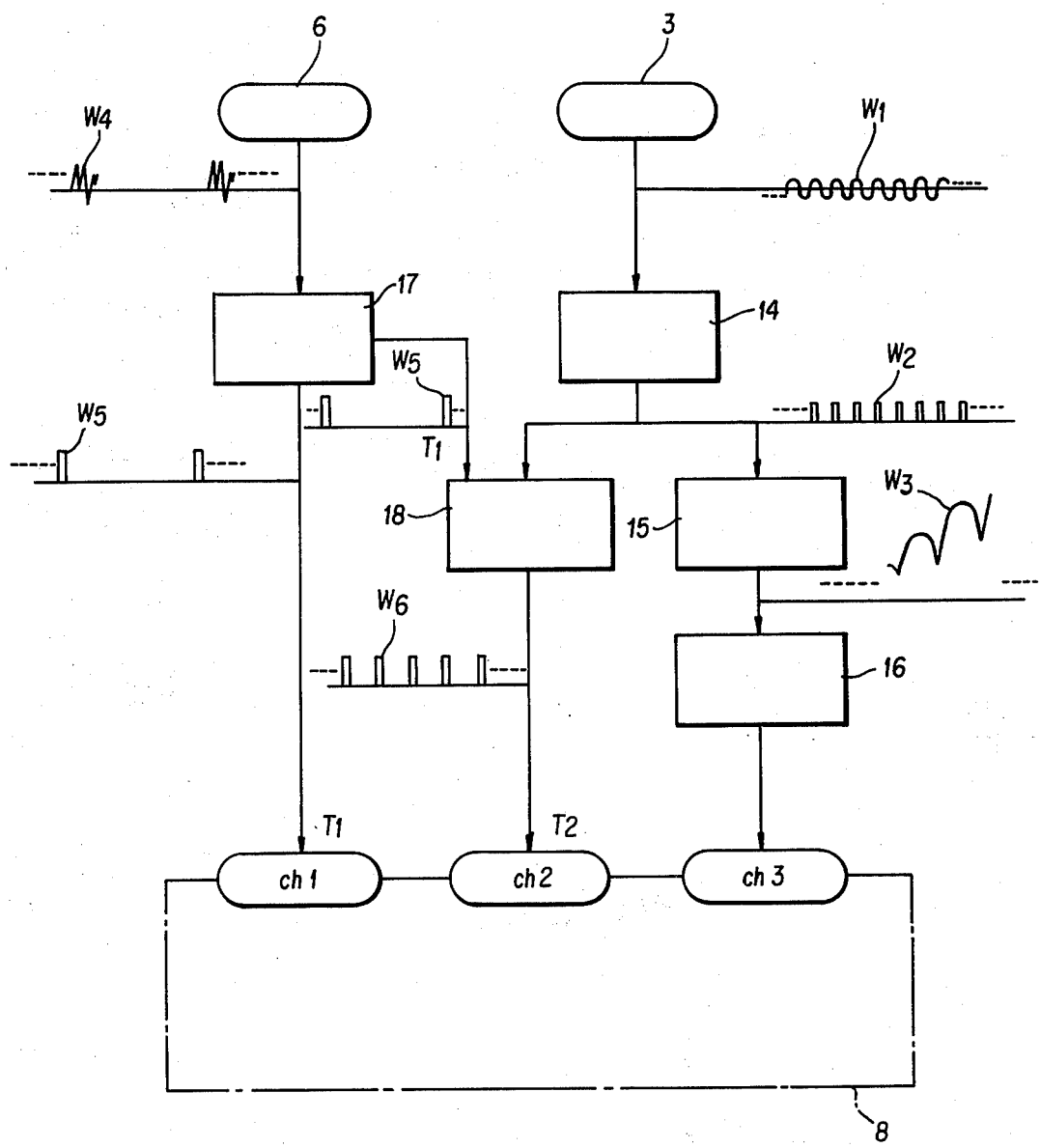
FIG. 2 is an electric systematic view of each bench.

Referring now to FIG. 1 of the drawings, there is shown a multiple-cylinder engine 1 of which rough idling is to be inspected on a test bench. The engine 1 has a clutch housing 2 for the outer periphery of a ring gear of the engine 1, to which a rotation change detecting sensor 3 such as an electromagnetic pickup is attached for reacting to the tooth surface of the ring gear to output a pulse of which period corresponds to the circumferential speed of the ring gear. There is further shown a first cylinder 4 of the engine 1 provided with a nozzle holder (in case of a diesel engine) or an ignition plug (in case of a gasoline engine) 5 to which a cylinder sorting sensor 6 such as a piezoelectric element or an electric discharge pickup is attached for generating output by vibration following injection of fuel or by electrically detecting changes in a high-voltage current at the time of ignition. The cylinder sorting sensor 6 is adapted to sort the cylinder 4 and to set timing for detecting an approximate point of the minimum value of the rate of rotation. The output from the rotation change detecting sensor 3 and the cylinder sorting sensor 6 is inputted into a central information processing member 8 of a computer as shown in FIGS. 2 to 4 under impedance conversion and wave-form shaping through a circuit of a bench control box 7 (see FIG. 2).

Figure 3:
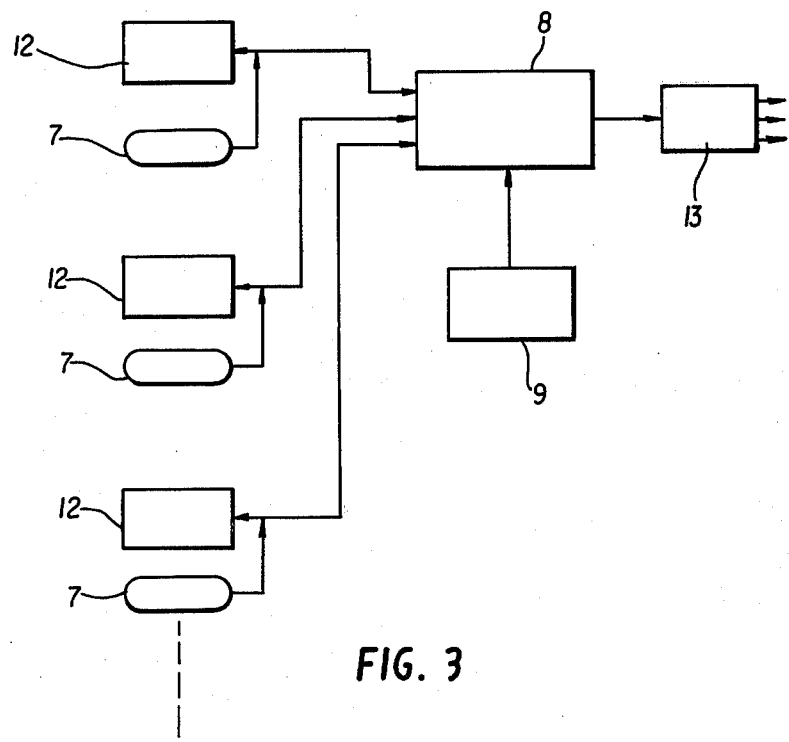
FIG. 3 is an electric systematic view of the entire apparatus.
Figure 4:
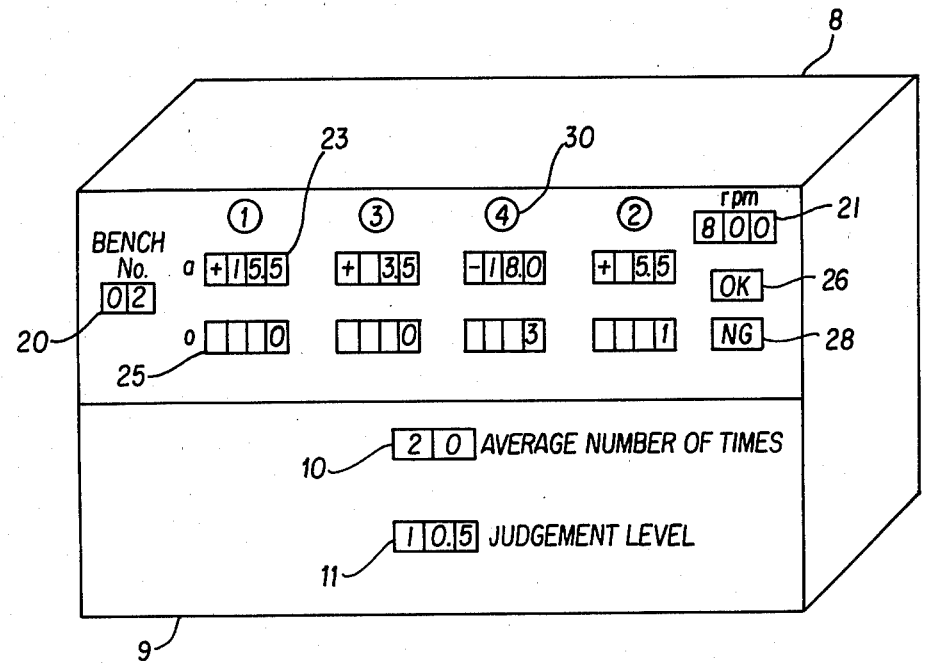
FIG. 4 is a rough perspective view showing a central information processing member and a central control panel.
Figure 6:
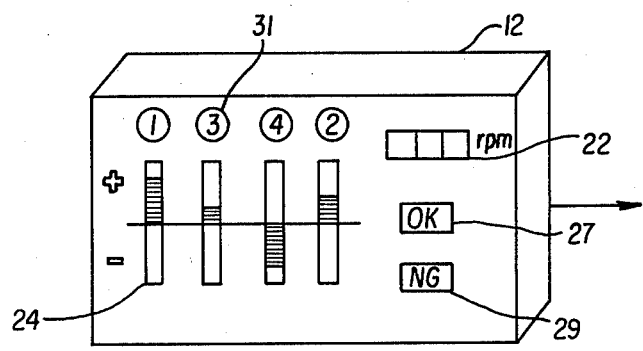
FIG. 6 is a rough perspective view of a bench display panel.

The data thus inputted into the central information processing member 8 and data set by digital switches 10 and 11 of a central control panel 9 as shown in FIGS. 3 and 4 are operationally processed by a computer program (see FIG. 3), and performance of each cylinder of the engine 1 in each bench is indicated on the central information processing member 8 and on a bench display panel 12 (see FIG. 6). Further, the data of the performance of each cylinder from the central information processing member 8 is outputted through an interface 13 as an information signal toward an outer auxiliary memory storage, a printer and an oscilloscope (not shown).

When the engine 1 is idly driven, the rotation change detecting sensor 3 outputs an AC pulse wave $W_1$ (FIG. 2) of which frequency is changed in answer to the circumferential speed of the ring gear. This output is then outputted through a waveform shaping circuit 14 which is a single stable multivibrator as a continuous pulse wave $W_2$ of which pulse width is certain and pulse period is changed in answer to the circumferential speed of the ring gear to be inputted into an F-V converter 15. The F-V converter 15 outputs a voltage wave $W_3$ of which voltage is changed in answer to the change in the circumferential speed of the ring gear, i.e., the change in speed of rotation of a crank shaft which is changed by suction, compression, explosion and exhaust strokes. The voltage wave $W_3$ is inputted into a channel-3 terminal ch3 of the central information processing member 8 as 8-bit data through an A-D converter 16. Further, since the engine 1 is a 4-cycle engine, the cylinder sorting sensor 6 outputs a peak-shaped pulsation wave $W_4$ corresponding to the time of starting of explosion in the vicinity of the minimum value of the rate of rotation corresponding to the first cylinder per every two rotations of the crank shaft. The pulsation wave $W_4$ generates through a wave-form shaping circuit 17 which is a single multivibrator pulse output $W_5$ of which pulse width is certain, pulse period is certain corresponding to two rotations of the crank shaft and pulse generation time is related to the first cylinder and which is synchronized with the approximate point of the minimum value of the rate of rotation. The pulse output $W_5$ is inputted into a channel-1 terminal ch1 of the central information processing member 8 as a timing start signal T1. Further, the pulse output $W_5$ generated from the wave-form shaping circuit 17 and corresponding to the timing start signal T1 and the pulse output $W_2$ generated from the wave-form shaping circuit 14 and corresponding to the number of teeth of the ring gear are inputted into a frequency dividing circuit 18. The frequency dividing circuit 18 generates pulse output $W_6$ per each two rotations of the crank shaft corresponding to one cycle operation of the engine 1, i.e., per each point where the number of the pulse from the wave-form shaping circuit 14 corresponding to the number of teeth of the ring gear in two rotations thereof is divided into quarters on the basis of the time at which the timing pulse T1 is generated from the wave-form shaping circuit 17, i.e., per each approximate point of the minimum value of the rate of rotations of each cylinder. The pulse output $W_6$ is inputted into a channel-2 terminal ch2 of the central information processing member 8 as a timing signal T2 which is synchronized with the timing start signal T1 and in the vicinity of the minimum value of the rate of rotations of each cylinder.

Figure 7:
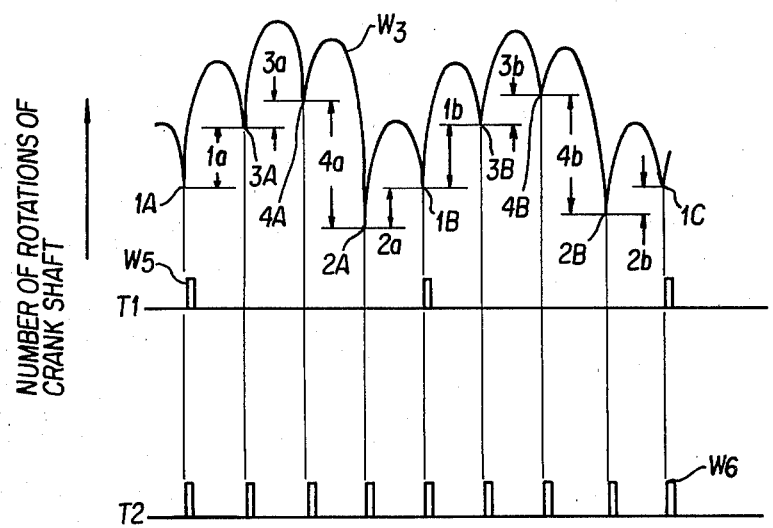
FIG. 7 is a diagram showing output wave forms from an F-V converter.

In such an engine idling condition of each bench, there are set the number of times of measurement of the rate of engine revolution which is necessary to obtain the average value by utilizing as the unit of measurement two rotations of the crank shaft corresponding to one cycle of the engine 1 by the digital switches 10 and 11 of the central control panel 9 and the allowable limit of judgement of yes or no depending on the speed difference $1a$, $3a$, $4a$, $2a$, $1b$ . . . (FIG. 7) of the minimum value of the rate of rotation by order of explosion of the cylinders. When a reset start switch 19 mounted to the bench control box 7 of the bench to be inspected is pushed by the inspector in this condition, the number of the bench is indicated on a panel display 20 of the central information processing member 8 and the speed of idling of the engine 1 as set in the bench is indicated on panel displays 21 and 22 of the central information processing member 8 and the bench control box 7. Further, there is started operation of the average value a and the standard deviation value $\sigma$ of the difference in the minimum value of the rate of rotation by order of explosion of the cylinders corresponding to the operation efficiency of each cylinder by the computer of the central information processing member 8.

Figure 5A:
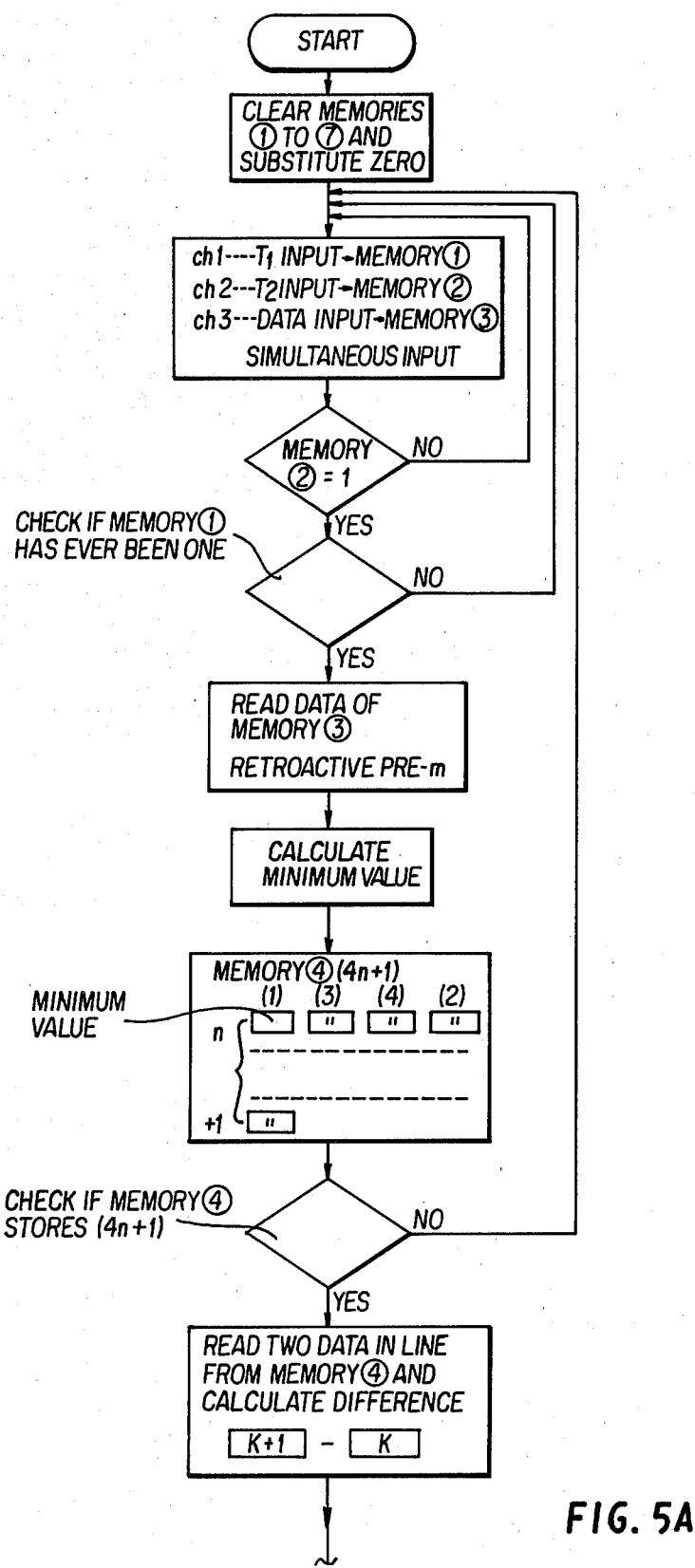
FIG. 5 is a flow chart of a computer of FIG. 4.
Figure 5B:
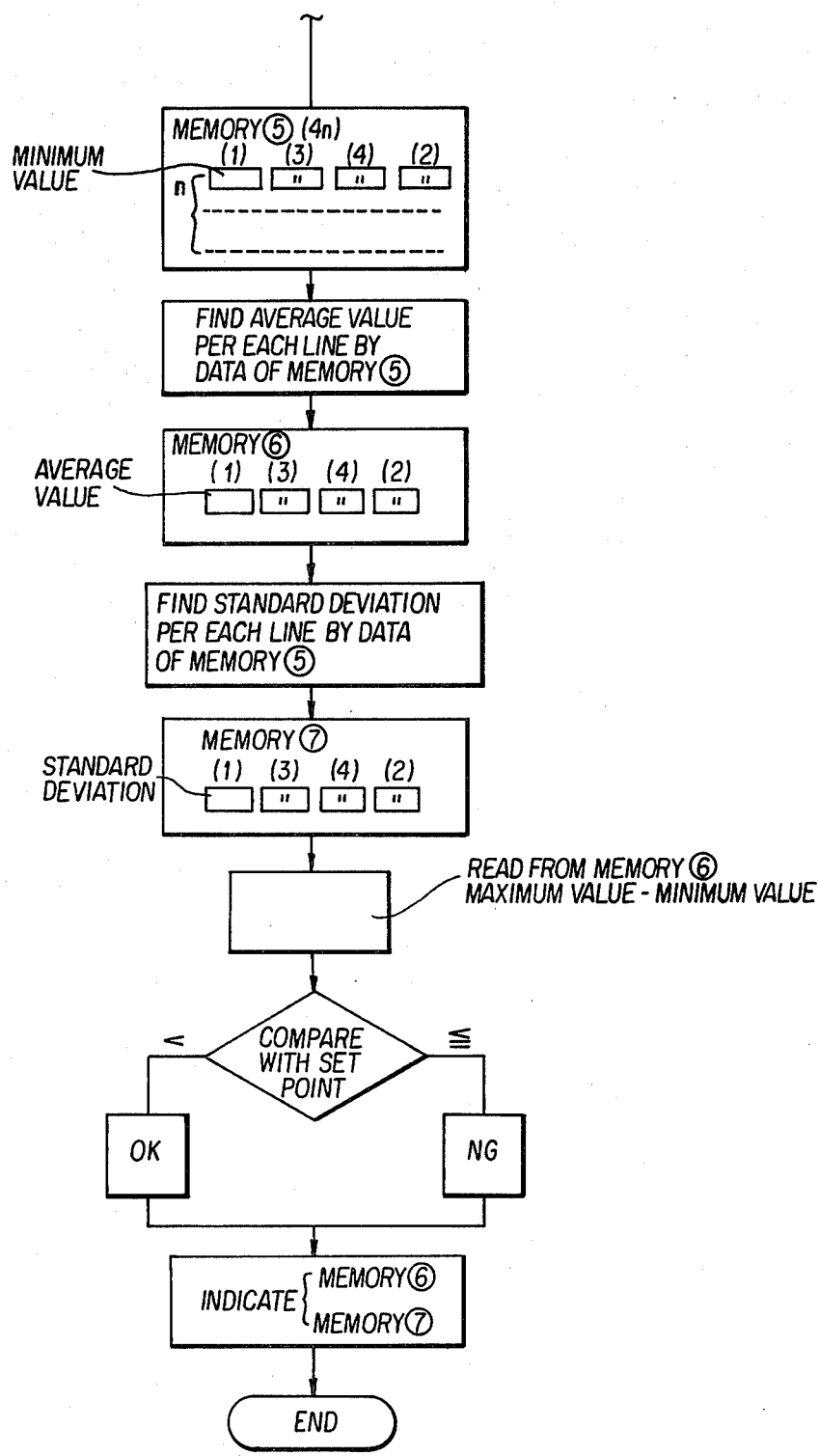

When the reset start switch 19 of the bench control box 7 is pushed, as shown in FIG. 5, the data from the sensors 3 and 6 inputted into the terminals ch1 to ch3 of the computer and memories ① to ⑦ operated on the basis of those data are cleared for which zero is substituted, and the timing signals T1 and T2 from the sensors 3 and 6 mounted to the engine and the rotation change signal from each cylinder are newly inputted into the computer through the bench control box 7. Then it is confirmed that the data memories ① and ② of the channel-1 ch1 and the channel-2 ch2 have both become one and the data in the data memory ③ of the channel-3 is read retroacting previous to number m set up in consideration of that the timing signal T2 does not completely correspond to the time of starting of explosion in each cylinder, and from this data one minimum value is obtained by utilizing a sub program. The minimum value thus obtained is stored in a position of the number of the first cylinder. This data storage is continued until the amount of the same becomes (4n+1) to the number of measurement n set up by the digital switch 11.

Then it is confirmed that the data (4n+1) is stored in the memory ④, and with respect to two data in line which are successively inputted, data obtained by subtracting the latter data K from the former data (K+1), namely, explosion unbalance amount (3A−1A=1a), (4A−3A=3a), (2A−4A=4a), (1B−2A=2a) . . . are stored in the memory ⑤. In the data of (4n) thus stored in the data memory ⑤, average values 1X, 3X, 4X and 2X of each cylinder are operated of which results are stored in the memory ⑥, and those data are digitally indicated on a panel display 23 of the central information processing member 8, and analogically indicated on a display 24 of the bench display panel 12 as a bar graph. Then standard deviations $1\sigma$, $3\sigma$, $4\sigma$ and $2\sigma$ of each cylinder in the memory ⑤ are operated and data in the memory ⑥ storing the results of said operation are indicated on a panel display 25 of the central information processing member 8 to enable inspection of working conditions of parts acting on engine revolution such as a fuel injection pump and ignition members. Thereafter the maximum and the minimum values of the data are read from the memory ⑥, and when the value of difference therebetween is smaller than the allowable limit set up by the digital switch 11, "OK" is indicated on displays 26 and 27 in the central information processing member 8 and the bench display panel 12 respectively, and when the value of said difference is larger than said allowable limit, "NG" is indicated on displays 28 and 29 in the central information processing member 8 and the bench display panel 12 respectively, and with respect to the cylinder showing the maximum absolute value in the memory ⑥, the number of the cylinder is indicated by lighting on displays 30 and 31 in the central information processing member 8 and the bench display panel 12 thereby showing that the subject cylinder is abnormal. By such indication, the number of the abnormal cylinder causing the engine failure may be searched and the cause for the abnormality may be found by comparing the data of the abnormal cylinder with those of normal cylinders indicated on the displays 23 and 24.

Said indication on the displays 30 and 31 completes the inspection of rough idling of the engine 1 in the bench, and thereafter the reset start switch 19 on the bench control box 7 of the next engine is pushed by the inspector so that the data stored in the data memories ① to ⑦ are all cleared for the next engine rough idling inspection.

Figure 8:
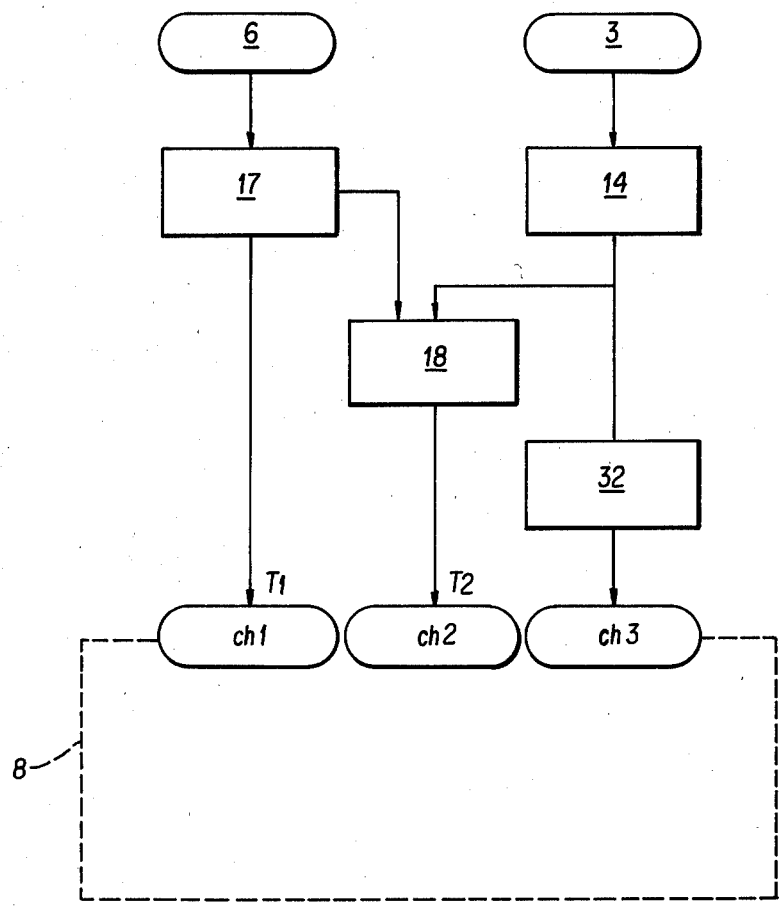
FIG. 8 is an electric systematic view of each bench of a second embodiment of the present invention.
Figure 9A:
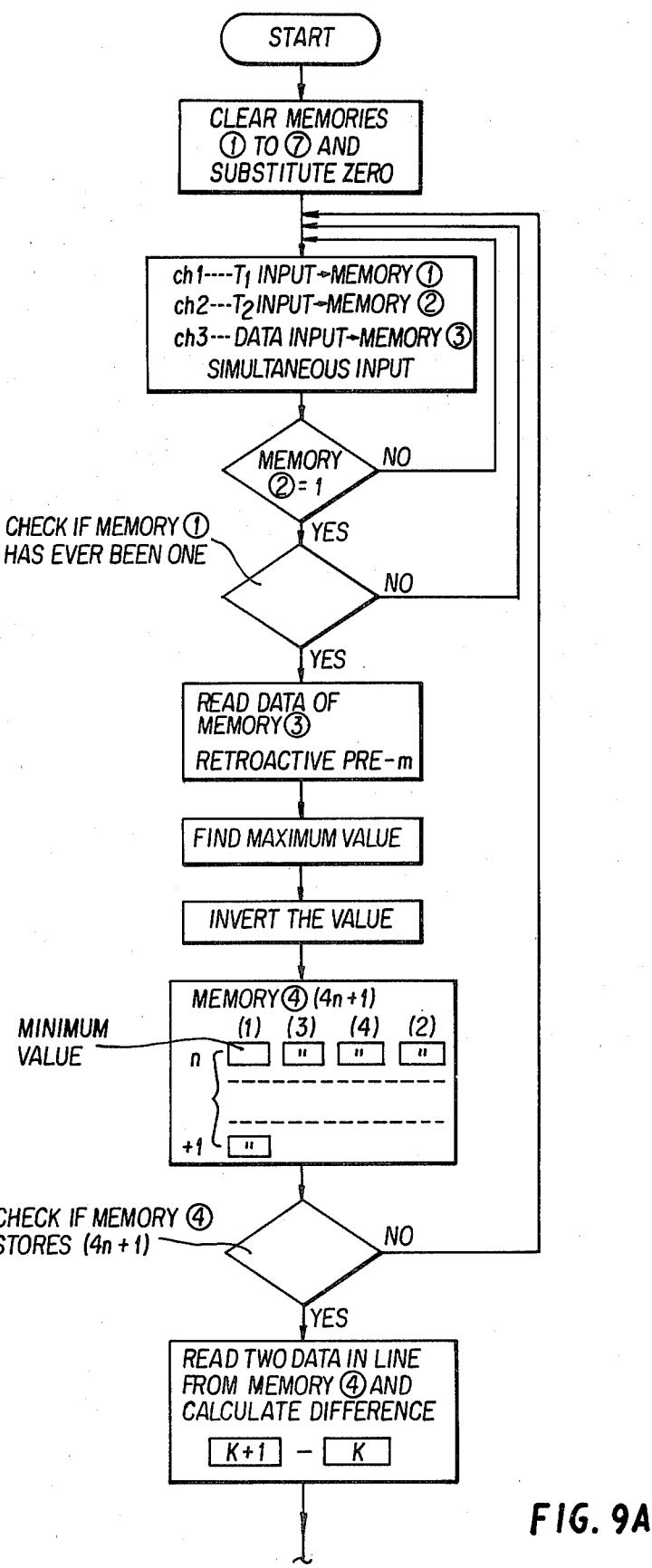
FIG. 9 is a flow chart of a computer used in the second embodiment.
Figure 9B:
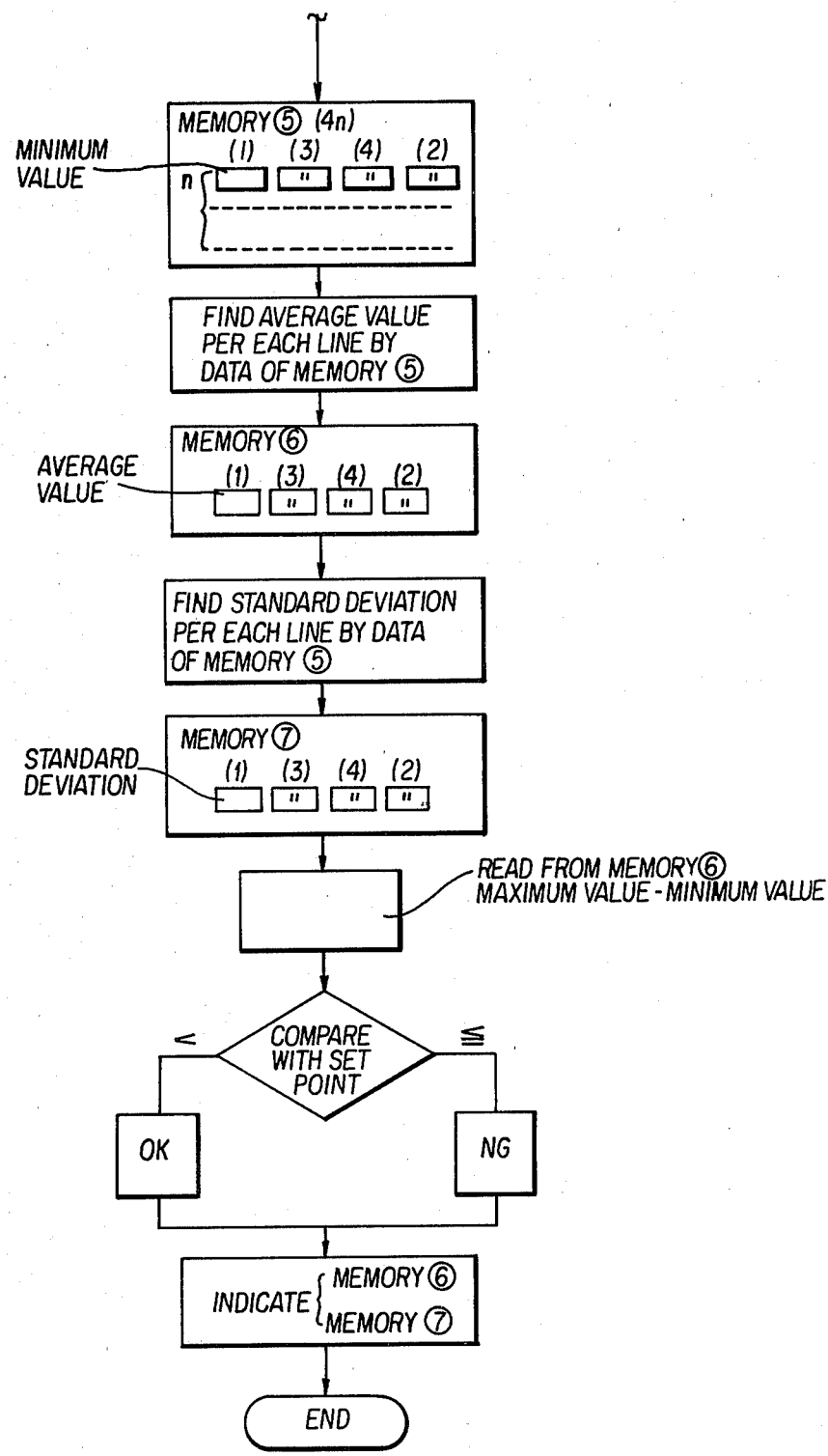

Attention is now drawn to FIGS. 8 and 9 in which a second embodiment of the present invention is shown. In this embodiment, the pulse output $W_2$ generated from the wave-form shaping circuit 14 and corresponding to the rotation speed of the ring gear is inputted into a period operation circuit 32 so that the same has a period of 8-bit data, and is inputted into the channel-3 ch3 of the computer.

The data is processed in the same manner as the first embodiment, except that the maximum value is found by a sub program in place of the minimum value in the first embodiment, and the maximum value is inverted in the next step. It means that F-V conversion is conducted by a program.

Namely, the data inputted into the memory ④ is identical with that in the first embodiment.

While the invention has been described with reference to a few preferred embodiments thereof, it is to be understood that modifications or variations may be easily made without departing from the scope of this invention which is defined by the appended claims.

What is claimed is:

1. A method of inspecting rough idling of a multiple-cylinder engine, said method comprising the steps of:
    obtaining the engine speed;
    detecting the time of starting of explosion in each cylinder;
    obtaining the minimum value of said engine speed in said time of starting of explosion in each cylinder;
    finding differences between said minimum values of every two adjacent cylinders;
    finding the average values of said differences between said minimum values in a plurality of cycles;
    finding the range of fluctuation of said average value between the maximum value in the plus side and the maximum value in the minus side; and
    comparing said range of fluctuation with a predetermined set value to inspect the condition of revolution of said engine.

2. A method of inspecting rough idling of a multiple-cylinder engine, said method comprising the steps of:
    obtaining the engine speed;
    detecting the time of starting of explosion in each cylinder;
    obtaining the minimum value of said engine speed in said time of starting of explosion in each cylinder;
    finding differences between said minimum values of every two adjacent cylinders;
    finding the average values of said differences between said minimum values in a plurality of cycles; and
    comparing the absolute values of said average values with each other to detect the cylinder having maximum absolute value and display the same.

3. A method of inspecting rough idling of a multiple-cylinder engine, said method comprising the steps of:
    obtaining the engine speed;
    detecting the time of starting of explosion in each cylinder;
    obtaining the minimum value of said engine speed in said time of starting of explosion in each cylinder;
    finding differences between said minimum values of every two adjacent cylinders; and
    finding standard deviations of said differences between said minimum values in a plurality of cycles and displaying the same.

4. The method as defined in claims 1, 2 or 3 wherein said time of starting of explosion in each cylinder is found by detecting the time of starting of explosion of one cylinder twice and equally dividing the period of the same by the number of said cylinders and said minimum value is that of said engine speed in the vicinity of said time of starting of explosion.

* * * * *